(12) United States Patent
Kondoh et al.

(10) Patent No.: US 8,240,039 B2
(45) Date of Patent: Aug. 14, 2012

(54) METHOD FOR PRODUCING PISTON FOR INTERNAL-COMBUSTION ENGINE

(75) Inventors: Atsushi Kondoh, Maebashi (JP); Osamu Tanaka, Maebashi (JP); Shoji Kanai, Ueda (JP); Takaaki Komatsu, Ueda (JP)

(73) Assignees: Riken Forge Co., Ltd (JP); Art Metal Mfg. Co., Ltd. (JP)

( * ) Notice: Subject to any disclaimer, the term of this patent is extended or adjusted under 35 U.S.C. 154(b) by 579 days.

(21) Appl. No.: 12/208,587

(22) Filed: Sep. 11, 2008

(65) Prior Publication Data

US 2009/0071001 A1    Mar. 19, 2009

(30) Foreign Application Priority Data

Sep. 18, 2007  (JP) .................... 2007-241175

(51) Int. Cl.
*B23P 15/10*   (2006.01)
(52) U.S. Cl. ........... 29/888.04; 29/888.041; 29/888.042; 29/888.044; 29/888.049
(58) Field of Classification Search ............... 29/888.04, 29/888.047, 888.049, 888.07, 888.072, 888.074, 29/888.041, 888.042, 888.044; 92/165 R, 92/166, 186
See application file for complete search history.

(56) References Cited

U.S. PATENT DOCUMENTS

| | | | | |
|---|---|---|---|---|
| 3,221,718 A | * | 12/1965 | Isley | ............ 123/41.35 |
| 4,765,167 A | * | 8/1988 | Sampson | ............ 72/68 |
| 4,843,698 A | | 7/1989 | Ripberger et al. | |
| 5,261,363 A | * | 11/1993 | Kemnitz | ............ 123/193.6 |
| 5,359,922 A | * | 11/1994 | Martins Leites et al. | ........ 92/189 |
| 6,260,472 B1 | * | 7/2001 | Zhu et al. | ............ 92/214 |
| 7,104,183 B2 | * | 9/2006 | Huang | ............ 92/186 |
| 7,421,782 B2 | | 9/2008 | Otaka | |
| 2001/0025568 A1 | * | 10/2001 | Kemnitz et al. | ............ 92/186 |
| 2004/0168319 A1 | * | 9/2004 | Mielke | ............ 29/888.04 |
| 2010/0108017 A1 | * | 5/2010 | Bing et al. | ............ 123/193.6 |

FOREIGN PATENT DOCUMENTS

JP    62-228646    10/1987

OTHER PUBLICATIONS

Japanese Office Action for Appln. No. 2007-241175 issued Dec. 4, 2009.

* cited by examiner

*Primary Examiner* — David Bryant
*Assistant Examiner* — Ryan J Walters
(74) *Attorney, Agent, or Firm* — Carter, DeLuca, Farrell & Schmidt LLP

(57) ABSTRACT

A method is provided for producing a piston for an internal-combustion engine of the structure in which a piston body which is composed of a crown having a groove for fitting a piston ring into an outer circumference surface and a skirt in connection with the bottom of the crown is provided with an annular cavity for flowing cooling liquid on an inside of the groove, the method comprising the steps of: forming the crown and the skirt individually; forming an annular groove for the annular cavity in the inner bottom of the crown and an annular rib in connection with the open edge of the annular groove before the crown and the skirt are joined together; bending the rib toward the opening of the annular groove by application of pressure to close the opening of the annular groove to thereby form the annular cavity; and joining the crown and the skirt together.

2 Claims, 3 Drawing Sheets

METHOD FOR PRODUCING PISTON FOR INTERNAL-COMBUSTION ENGINE

BACKGROUND OF THE INVENTION

1. Technical Field

The present invention relates to a fabrication technique of a piston for an internal-combustion engine. In particular, the present invention relates to a method for producing a piston for an internal-combustion engine having an annular cavity for flowing cooling liquid (cooling oil) into a crown to be exposed to high temperatures.

Priority is claimed on Japanese Patent Application No. 2007-241175, filed Sep. 18, 2007, the content of which is incorporated herein by reference.

2. Background of the Related Art

In general, a piston for use in an internal combustion such as a diesel engine and a petrol engine is made of an aluminum alloy or iron. In the case of a large size diesel engine, iron forging is preferred to withstand its heavy loads. However, in a piston made of iron, a temperature of a top surface of its crown reaches as high as about 500° C. during operation. Even in the case of a piston made of aluminum, the temperature still reaches as high as about 350° C. Since the temperature also becomes high at the periphery of a groove (ring groove) into which a piston ring is mounted, an annular cavity for flowing cooling liquid is generally provided inside the ring groove in order to avoid adverse effects from overheating of the piston ring.

The annular cavity can be formed in casting using a readily-disintegrative core that is made of sand, however, the operation of forming the core or removing the core from the inside of the casting after the core is disintegrated is not easy, resulting in time loss and cost increase.

Hence, after a crown and a skirt of a piston body are formed individually in sections by forging, the parting surface between the crown and the skirt is joined by friction welding, whereby an annular cavity is formed (for example, Japanese Unexamined Patent Application Publication No. 2001-107803).

Furthermore, after an annular groove is formed at the top surface or the upper outer circumference surface of a crown and a rib is formed in connection with the open edge of the annular groove, the rib is bent toward the opening of the annular groove by pressing using a pressure roller, whereby an annular cavity is formed (for example, Japanese Unexamined Patent Application Publication No. 2006-46320).

According to Japanese Unexamined Patent Application Publication No. 2001-107803, this produces the effect of producing a piston body more efficiently compared to an integrated molding using a core. However, when the crown is press-welded to the skirt to thereby form an annular cavity therebetween, a curled burr is generated inside the annular cavity due to friction welding, which narrows the volume of the annular cavity. As a result, flowability of cooling liquid may be lowered, whereby the crown and the skirt of the piston may be burnt or knocking may occur due to overheating of the crown.

In Japanese Unexamined Patent Application Publication No. 2006-46320, since score lines (joint areas between the opening and the rib of the annular groove) may occur during the formation of the annular cavity in the top surface or the upper outer circumference surface of the crown, an inappropriate machining may cause the ejection of cooling liquid in the annular cavity into the combustion chamber through the score lines.

Furthermore, since the top surface and the upper outer circumference surface of the crown are exposed to high temperature and high pressure, high concentrations of stresses may occur at the score lines due to high temperature and high pressure, resulting in breakage of the piston.

The present invention has been made in view of the aforementioned circumstances, and an object of the present invention is to provide a method for efficiently producing a long-life, high-quality piston for an internal-combustion engine having an annular cavity into which cooling liquid can flow effectively.

SUMMARY OF THE INVENTION

For achieving the above objects, the present invention provides a method for producing a piston for an internal-combustion engine of the structure in which a piston body which is composed of a crown having a groove for fitting a piston ring into an outer circumference surface and a skirt in connection with the bottom of the crown is provided with an annular cavity for flowing cooling liquid on an inside of the groove, the method comprising the steps of: forming the crown and the skirt individually; forming an annular groove for the annular cavity in the inner bottom of the crown and an annular rib in connection with the open edge of the annular groove before the crown and the skirt are joined together; bending the rib toward the opening of the annular groove by application of pressure to close the opening of the annular groove to thereby form the annular cavity; and joining the crown and the skirt together.

In the above method, the rib is bent toward the opening of the annular groove by pressing a pressure roller for imparting a bending load to the rib.

The present invention further provides a method for producing a piston for an internal-combustion engine of the structure in which a piston body which is composed of a crown having a groove for fitting a piston ring into an outer circumference surface and a skirt in connection with the bottom of the crown is provided with an annular cavity for flowing cooling liquid on an inside of the groove, the method comprising the steps of: forming the crown and the skirt individually; forming an annular groove for the annular cavity in the inner bottom of the crown and an annular rib in connection with the outer open edge of the annular groove before the crown and the skirt are joined together; joining the crown and the skirt together; and forming the annular cavity by pressing the rib inwardly so as to bring the tip of the rib into close contact with the upper outer circumference of the skirt.

According to the present invention, since the crown and the skirt are formed individually; the annular groove for the annular cavity in the inner bottom of the crown and an annular rib in connection with the open edge of the annular groove are formed before the crown and the skirt are joined together; the rib is bent toward the opening of the annular groove by application of pressure to close the opening of the annular groove to thereby form the annular cavity; and the crown and the skirt are joined together, a curled burr is not generated inside the annular cavity, whereby cooling liquid can smoothly flow thereinto. Besides, score lines generated by the formation of the annular cavity do not occur at the top surface and the upper outer circumference surface of the crown, both of which are exposed to high temperature and high pressure, whereby a long-life, high-quality piston for an internal-combustion engine that is less prone to breakage can be produced.

In addition, since the crown and the skirt are joined together after the annular cavity is formed in the crown, the skirt is out of the way during the formation of the annular cavity, whereby the annular cavity can be readily and well-formed.

Furthermore, since the rib is bent toward the opening of the annular groove by pressing a pressure roller, the annular cavity having the uniform cross-sectional shape can be efficiently formed entirely around the circumference of the crown.

Still furthermore, since the crown and the skirt are formed individually; an annular groove for the annular cavity in the inner bottom of the crown and an annular rib in connection with the outer open edge of the annular groove are formed before the crown and the skirt are joined together; the crown and the skirt are joined together; and the rib is pressed inwardly so as to bring the tip of the rib into close contact with the upper outer circumference of the skirt to thereby form the annular cavity, score lines generated by the formation of the annular cavity do not occur at the top surface and the upper outer circumference surface of the crown, which are exposed to high temperature and high pressure, whereby a long-life, high-quality piston for an internal-combustion engine that is less prone to breakage can be readily and efficiently produced.

DETAILED DESCRIPTION OF THE INVENTION

Figure 1:
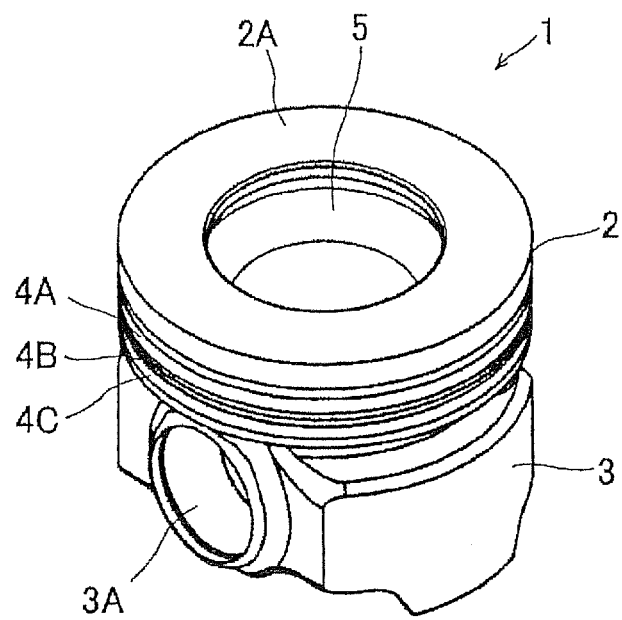
FIG. 1 is a perspective view illustrating the piston for the internal-combustion engine according to the present invention.
Figure 2:
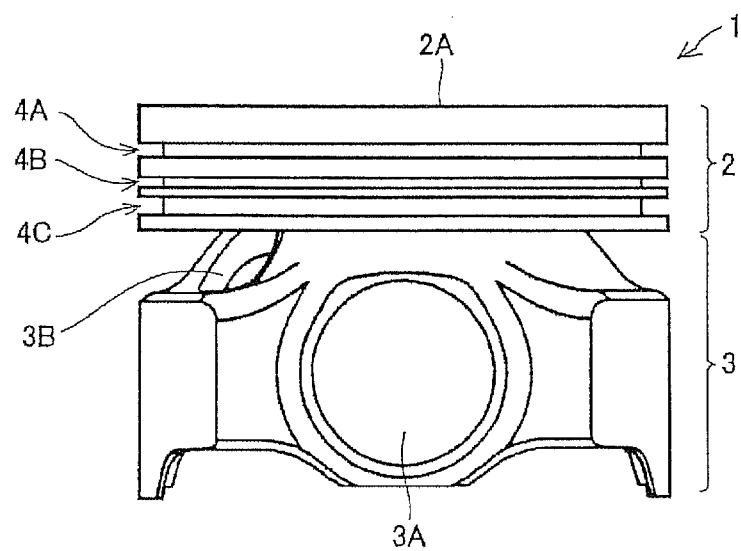
FIG. 2 is a front view of the piston for the internal-combustion engine according to the present invention.

Hereinafter, the present invention will be described in detail below with reference to the drawings. FIG. 1 is a perspective view illustrating a form of the piston for the internal-combustion engine according to the present invention. FIG. 2 is a front view of the same piston. In FIGS. 1 and 2, numeral 1 denotes a piston body that is reciprocally moved in a cylinder (not shown), and the piston body 1 is composed of a crown 2 which is the upper structure of the piston body 1 and a skirt 3 in connection with the bottom of the crown 2.

The outer circumference surface of the crown 2 has three circumferentially continuous grooves 4A, 4B, and 4C (ring grooves) formed at predetermined intervals in the axial direction, and a piston ring (not shown) is fitted into each of the grooves 4A, 4B, and 4C.

As shown in FIG. 1, a combustion cavity 5 is formed in the central region of the top surface 2A (piston head) of the crown 2, which is the combustion chamber to be formed between the piston head and a cylinder head (not shown), and fuel is blown into the combustion cavity 5.

On the other hand, the skirt 3 constitutes the lower structure of the piston body 1 and serves to receive lateral pressure in the cylinder (not shown). A pin receiving hole 3A is bored at the peripheries of the skirt 3 to pass a piston pin (not shown) therethrough. One end (small end) of a connecting rod (not shown) is coupled to the piston pin inserted into the pin receiving hole 3A.

Figure 3:
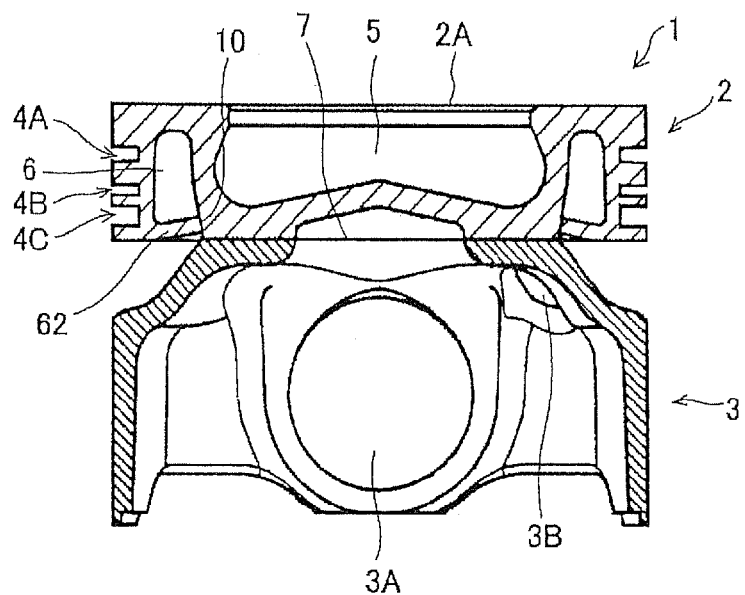
FIG. 3 is a longitudinal sectional view of the piston for the internal-combustion engine according to the present invention.

Next, FIG. 3 shows a longitudinal sectional view of the piston body. As is evident from FIG. 3, an annular cavity 6, which surrounds the combustion cavity 5 inside grooves 4A, 4B, and 4C, is formed in the crown 2. The annular cavity 6 is filled with cooling liquid for cooling the crown 2. The cooling liquid circulates between the annular cavity 6 and an oil cooler (not shown).

A notch 3B for introducing the cooling liquid from an oil jet (not shown) is formed in the skirt 3. The cooling liquid is supplied to or discharged from the annular cavity 6 through a line communicated with the notch 3B.

The crown 2 and the skirt 3, both described above, are formed individually by forging, casting, or cutting machining. The crown 2 and the skirt 3 are then joined together by pressure welding to thereby form the piston body 1. In FIG. 3, numeral 7 denotes a joint surface between the crown 2 and the skirt 3.

Example 1

Figure 4:
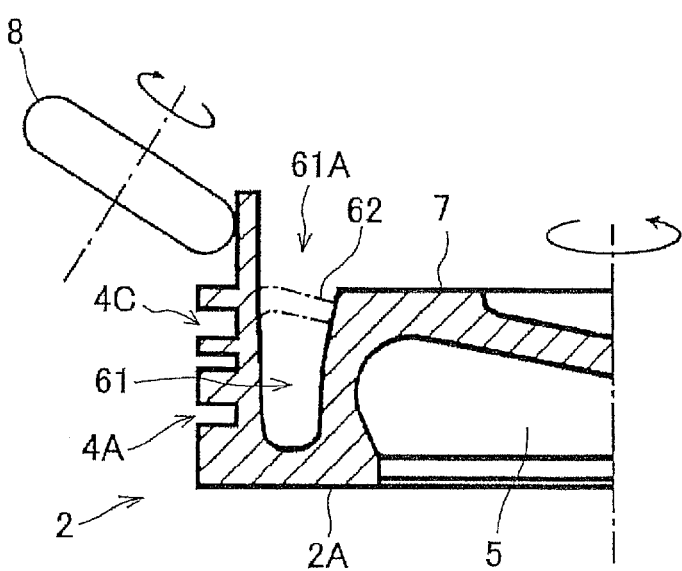
FIG. 4 is an explanatory drawing illustrating the formation of an annular cavity.

A method for producing the above-described piston will now be described. First, as in the above description, the crown 2 and the skirt 3 are formed individually. In particular, an annular groove 61 shown in FIG. 4 is formed in the inner bottom of the crown 2 before the crown 2 and the skirt 3 are joined. In addition, an annular rib 62 is formed in connection with the open edge of the annular groove 61.

The opening 61A of the annular groove 61 is eventually closed with the rib 62 to thereby form the annular cavity 6. In the case of the crown 2 provided with an unfinished annular cavity 6, the crown 2 can be readily molded without a core that is complicated to form even by casting, and can be readily produced by forging or cutting machining.

In FIG. 4, the annular groove 61 is formed in the inner bottom (outer circumference of the bottom) of the crown 2 with its bottom open and the rib 62 is formed along the outer open edge of the annular groove 61. However, the rib 62 may also be formed along the inner open edge of the annular groove 61. In addition, the annular groove 61 and the rib 62 can be formed in the crown 2 either simultaneously or sequentially by casting, forging, or cutting.

The rib 62 is bent by pressure toward the opening 61A of the annular groove 61 so as to close the opening 61A of the annular groove 61 with the rib 62 to thereby form the aforementioned annular cavity 6. More specifically, the crown 2 is located in a predetermined position as shown in FIG. 4. Preferably, while rotating the crown 2, a pressure roller 8 for imparting a bending load to the rib 62 is pressed against the rib 62 so as to bend the rib 62 toward the opening 61A of the annular groove 61, whereby the annular cavity 6 for flowing cooling liquid is formed inside the grooves 4A, 4B, and 4C.

As a consequence, the annular cavity 6 is formed in the crown 2. The crown 2 and the skirt 3 are then joined together by pressure welding to thereby form the piston body 1.

Figure 5:
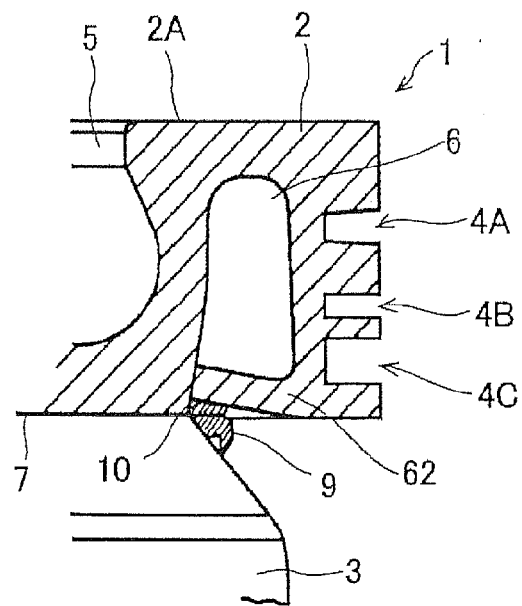
FIG. 5 is a partially enlarged view of a piston provided with the annular cavity.

Moreover, as shown in FIG. 5, the annular cavity 6 is formed at a position external to the joint surface 7 between the crown 2 and the skirt 3. Since the tip of the rib 62 is brought into close contact with the inner circumferential surface of the annular groove 61, which is the base of the annular cavity 6, at a position in close proximity to the outer circumferential edge of the joint surface 7, a curled burr 9 which is generated outside the joint surface 7 during pressure welding of the crown 2 and the skirt 3 serves as the sealing member for sealing the score line 10 (where the inner circumferential surface of the annular groove 61 abuts the tip of the rib 62) of the annular cavity 6. Hence, the sealed annular cavity 6 which completely closes the score line 10 can prevent cooling liquid leakage out of the score line 10. However, the present invention does not require that the score line 10 be completely closed by the curled burr 9 or other means. Given that the score line 10 has a slight clearance, resulting in cooling liquid leakage out of the score line 10, the cooling liquid does not enter into a combustion chamber but flows into a crankcase. As a result, the cooling liquid is delivered from the crankcase to the annular cavity 6, whereby it can be reused repeatedly.

Example 2

Figure 6:
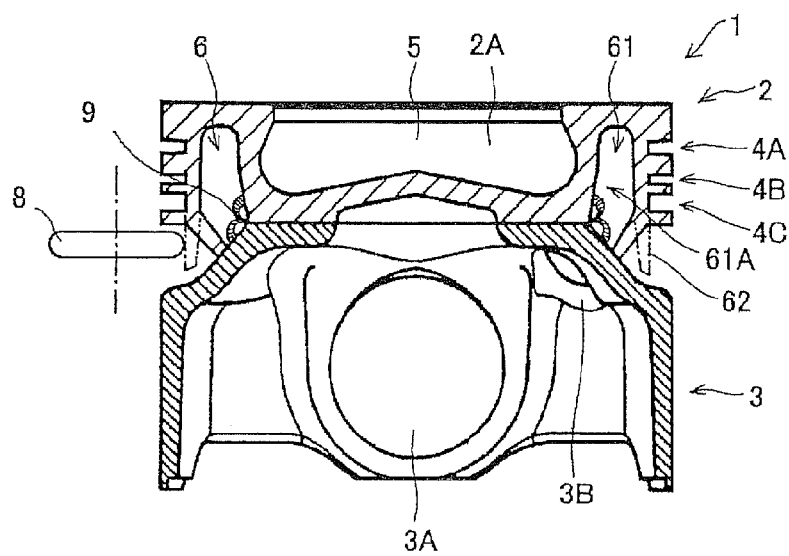
FIG. 6 is an explanatory drawing illustrating a modification of the present invention.

A modification of the present invention will now be described based on FIG. 6. In this example, the crown 2 and the skirt 3 are formed individually as in Example 1 except that the annular cavity 6 is formed after the crown 2 and the skirt 3 are joined together.

In other words, the annular groove 61 and the rib 62 are formed in the crown 2 before the crown 2 and the skirt 3 are joined together as in Example 1. More specifically, the annular cavity 61 is formed between the grooves 4A to 4C and the combustion cavity 5 so as to form the annular cavity 6 in the inner bottom of the crown 2, and the annular rib 62 is formed in connection with the outer open edge of the annular groove 61. In this example, as shown in FIG. 6, the crown 2 and the skirt 3 are joined together by pressure welding. The rib 62 which extends perpendicularly downward to the skirt 3 is then pressed inwardly to bring the tip of the rib 62 into close contact with the upper outer circumference (a shoulder portion tapered toward the inside of the annular groove 61) of the skirt 3, whereby the annular cavity 6 is formed.

In particular, in this example, it is again preferred that the pressure roller 8 for imparting a bending load to the rib 62 be pressed against the rib 62 while rotating the crown 2 integrated with the skirt 3 so as to bend the rib 62 to the opening 61A of the annular groove 61. In this manner, the rib 62 can be uniformly bent efficiently.

Additionally, in this example, since the outer circumference of the joint surface 7 is covered with the rib 62, the curled burr 9 which is generated by pressure welding of the crown 2 and the skirt 3 may remain within the annular cavity 6, which may cause a decrease in flowability of cooling liquid. The curled burr 9 which is formed on the outside of the joint surface 7 can be removed by the insertion of a tool (not shown) between the rib 62 and the skirt 3 before the annular groove 61 is closed.

While the present invention is described using the preferred examples, the present invention is not limited to the above examples. The rib 62 can also be bent using pressing machine or hammer without rotating the crown 2.

What is claimed is:

1. A method for producing a piston for an internal-combustion engine, the piston including a crown having an annular cavity for flowing cooling liquid therethrough and a skirt, the method comprising the steps of:

forming the crown and the skirt individually;

forming an annular groove for the annular cavity in the crown and an annular rib adjacent an opening of the annular groove;

bending the rib toward the opening of the annular groove by application of pressure to close the opening of the annular groove to thereby form the annular cavity; and joining the crown and the skirt together to form a burr adjacent joined surfaces of the crown and the skirt, the burr creating a seal between the rib and the crown, thereby sealing the annular cavity.

2. The method according to claim 1, wherein the crown and the skirt are joined together via pressure welding.

* * * * *